United States Patent [19]

Poulain et al.

[11] Patent Number: 5,342,809
[45] Date of Patent: Aug. 30, 1994

[54] PROCESS FOR THE SYNTHESIS OF FLUORIDE GLASS BY THE SOL - GEL METHOD AND OPTICAL FIBRE PRODUCED FROM THE FLUORIDE GLASS OBTAINED ACCORDING TO THIS PROCESS

[75] Inventors: Marcel Poulain; Mohammed Saad, both of Rennes, France

[73] Assignee: France Telecom Etablissement Autonome de Droit Public, Paris, France

[21] Appl. No.: 43,781

[22] Filed: Apr. 6, 1993

[30] Foreign Application Priority Data

Apr. 8, 1992 [FR] France .................. 92 04300

[51] Int. Cl.$^5$ .................. C03C 3/32; C03C 13/04
[52] U.S. Cl. ........................ 501/12; 501/37; 501/40; 65/17.2; 65/388
[58] Field of Search ........... 501/12, 37, 40; 65/2

[56] References Cited

U.S. PATENT DOCUMENTS 4,761,387  8/1988  Tokida et al. .................. 501/40
4,946,490  8/1990  Hall et al. .................. 501/40 X

OTHER PUBLICATIONS

Nato Asi Ser., Ser. E, 123, 1987, pp. 385–391, D. R. Ulrich, "Interactions with Other Fields".
Chemical Abstracts, vol. 110, No. 12, Jun. 12, 1989, AN 217717p, K. Fujiura, et al., p. 315, Japanese Journal of Applied Physics, vol. 28, No. 1, 1989, pp. L147–L149.
J. Mater. Res., vol. 7, No. 6, Jun. 1992, pp. 1534–1540, A. M. Mailhot, et al., "Reactive Atmosphere Synthesis of Sol–Gel Heavy Metal Fluoride Glasses".

*Primary Examiner*—Karl Group
*Attorney, Agent, or Firm*—Oblon, Spivak, McClelland, Maier & Neustadt

[57] ABSTRACT

The present invention relates to a process for the synthesis of fluoride glass by the sol-gel method.

The object of the invention is to synthesize an impurity-free fluoride glass.

This object is achieved with the aid of a process having stages consisting of preparing a wet oxygenated gel from precursors containing all the cations constituting said fluoride glass, hydrolyzing said gel, drying said gel and in which the process is characterized in that it also comprises the stage consisting of treating said oxygenated gel by a fluorinating agent in the vapour phase, at a temperature below the glass crystallization point.

This process more particularly makes it possible to produce fluoride glass for optical fibres.

17 Claims, 1 Drawing Sheet

PROCESS FOR THE SYNTHESIS OF FLUORIDE GLASS BY THE SOL - GEL METHOD AND OPTICAL FIBRE PRODUCED FROM THE FLUORIDE GLASS OBTAINED ACCORDING TO THIS PROCESS

The present invention relates to a process for the synthesis of fluoride glass by the sol-gel method, as well as to an optical fibre produced from a fluoride glass obtained by this process.

The interest of fluoride glasses for infrared transmission, particularly by optical fibres, has been stressed in numerous scientific articles reflecting the high degree of activity in connection with this subject since 1980. This subject is specifically dealt with by the work "Fluoride Glasses" by A. COMYNS and published by J. Wiley and Sons in 1989. These optical fibres have numerous applications in connection with spectroscopy, lasers, sensors and infrared imaging devices.

One of the technical problems encountered during the development of these new glass types is the attaining of very high purity materials, as well as the elimination of defects and impurities of all types which are prejudicial to the optical quality of the components. However, conventional glass making procedures based on the melting and casting of molten mixtures in platinum crucibles lead to residual pollution linked with the contact of the glass with the metal and the practical impossibility of controlling the physicochemical factors leading to a certain contamination of the glass. Various procedures have been envisaged for obviating these disadvantages.

A first method consists of synthesizing fluoride glass layers by chemical vapour deposition (CVD), by analogy with the methods used for producing silica-based optical fibres. This method consists of depositing fluoride glass films on a substrate, but at very high temperatures. The latter factor limits the choice of substrates on which said deposits can be produced. The tests carried out have made it possible to obtain encouraging results, but it has been found that it is difficult to pass into the gaseous procedure cations such as zirconium and barium and that it was also not easy to control or monitor the fluorination reactions.

An article by IAN M. THOMAS entitled "Porous Fluoride Antireflective Coatings" published in Applied Optics, vol.27, no.16, 15.8.1988, pp.3356-3358 also discloses a fluoride coating synthesis process using the sol-gel method. In this case use is made of magnesium methoxide dissolved in methanol added to an aqueous hydrogen fluoride solution in order to obtain a $MgF_2$ colloidal suspension, which is then deposited. However, this process leads to a colloidal solution and not to a glass and by evaporation and densification a polycrystalline material is obtained therefrom.

Finally, the major difficulty encountered in obtaining fluoride glass by the sol-gel method relates to the water, which is looked upon as an impurity very harmful to these materials. For this reason consideration has been given to the synthesizing of entirely fluorinated gels or colloids within non-aqueous solvents (tetrachlorotetrafluoropropane). However, this has not made it possible to achieve satisfactory results, as can be gathered from the article "Sol-Gel preparation of amorphous ZBLA heavy metal fluoride powders" by P. J. MELLING and M. A. THOMPSON in Journal of Material Research Society, vol.5, no.5, May 1990, pp.1092–1094.

Finally, the article by D. R. ULRICH "Interaction with other Fields" NATO ASI Ser., Ser. E. 123 (Halide Glass Infrared Fibreopt.), 1987, pp.385-391 provides a theoretical approach to the synthesis of fluoride glasses by the sol-gel method. However, this article provides no practical details of achieving this.

The object of the invention is consequently to obviate the aforementioned disadvantages.

The invention therefore relates to a process for the synthesis of fluoride glass by the sol-gel method having the stages of preparing a wet oxygenated gel from precursors containing all the cations constituting said fluoride glass, hydrolyzing said gel, generally by adding an acid solution and then drying said gel.

This process is characterized by the additional stage of treating said oxygenated gel with a fluorinating agent in the vapour phase at a temperature below the glass transition point, said fluorinating agent being chosen from among hydrogen fluoride, gaseous fluorine, chlorine trifluoride or bromine trifluoride.

The fluorinating agents used and in particular gaseous hydrogen fluoride have the advantage being obtainable with a purity well above that of the ammonium difluoride conventionally used for the synthesis of fluoride glasses.

According to a preferred variant of the invention, the precursors used for the preparation the wet oxygenated gel are $C_1$ to $C_4$ alkoxides of cations constituting the fluoride glass and preferably methoxides of said cations. These alkoxides are dissolved in an alcoholic solution.

These precursors can easily undergo specific purification treatments, which are impossible with the mineral precursors conventionally used during the synthesis of fluoride glasses. Moreover, alcoholic solvents make it possible to dissolve the alkoxides and have the advantage of being miscible with water or aqueous acid solutions and of being easily eliminateable by heating. It is also possible to use ketones as solvents.

The cations are in particular chosen from among elements of groups Ia, IIa, IIIa, IVa, IIb, IIIb or IVb of the periodical classification of elements or from among lanthanides or actinides.

Preferably, the cations are chosen from among sodium, magnesium, calcium, strontium, barium, scandium, yttrium, lanthanum, thorium, zirconium, hafnium, zinc, cadmium, boron, aluminium, gallium, indium, silicon and lead.

Gallium, indium, scandium or zinc are able to lead to fluoride glasses. Thorium, calcium, strontium, lead or cadmium can be incorporated into fluorozirconate glasses. Preferably, the fluorination temperature is between approximately 150° and 250° C.

Thus, the temperatures required for performing the process are well below those of conventional processes. By gentle chemistry sol-gel methods, it is thus possible to obtain vitreous elements without ever reaching the melting point of the glass. Thus, there is a reduction to the contamination risks linked with the temperature and vitreous elements are obtained which could not be obtained by conventional procedures.

Finally, the invention also relates to an optical fibre produced from the fluoride glass prepared according to the synthesis process briefly described hereinbefore.

Thus, the process according to the invention makes it possible to develop successive deposits of vitreous coatings of variable and controlled thicknesses or also the production of tubes, bars or preforms/blanks of fluoride glass with a very high level of purity. These components form the basis for fluoride glass optical fibre technologies, which have numerous applications, as stated hereinbefore. These optical fibres have a spectral range between 1 and 4 μm.

BRIEF DESCRIPTION OF DRAWINGS

The invention is described in greater detail hereinafter relative to a non-limitative embodiment and with reference to the attached drawings, wherein show.

Figure 1:
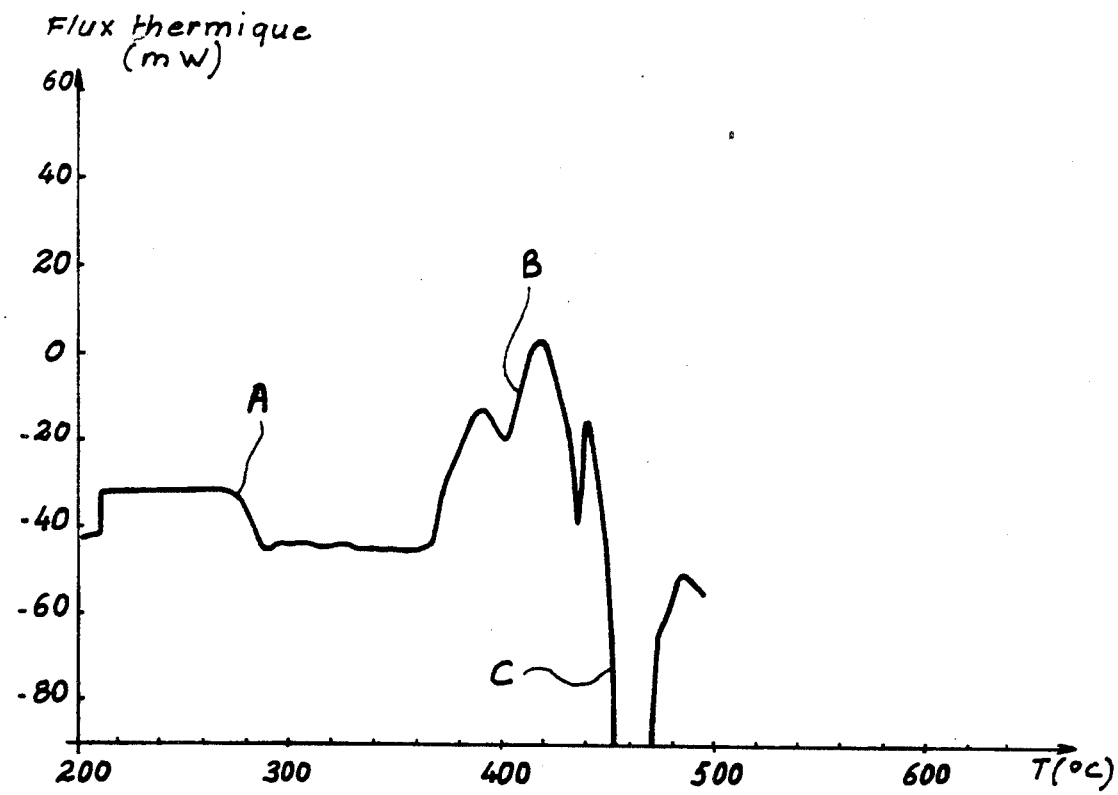
FIG. 1 A graph showing the thermal flux variation in mW, as a function of the temperature in °C.

The fluoride glass synthesis process according to the invention comprises the stages of preparing a wet oxygenated gel from precursors containing all the cations constituting said fluoride glass, hydrolyzing the gel, drying the gel and then treating the oxygenated gel by a fluorinating agent in the vapour phase at a temperature below the crystallization point of the glass.

The fluoride glass according to the invention is synthesized by the sol-gel method consisting of preparing a solution of precursors containing all the cations (metals) constituting the glass which it is wished to obtain, followed by the transformation of this solution of precursors into an oxide, which will then be fluorinated.

The cations constituting the fluoride glass are chosen from among metals of groups Ia, IIa, IIIb, IVb, IIb, IIIa or IVa of the periodic classification or from among lanthanides or actinides. Preferably, they are chosen from among those given at the start of the present description.

The precursors will be chosen from among alkoxides, acetates or salts of the metals given hereinbefore, as a function of the cations which it is wished to obtain in the final fluoride glass. Acetates or salts will always be simultaneously present with the alkoxides. It is also possible to use the alkoxides alone. The relative proportions of these different precursors will also be a function of the percentages of the cations which it is wished to obtain in the final glass.

According to a first embodiment of the invention, an oxygenated gel will be formed containing a variable proportion of silicon or boron which can extend up to 50% of the total of the cations in the final fluoride glass, the other cations being chosen from the remaining cations indicated hereinbefore. The incorporation of silicon serves to facilitate the formation of the wet gel and to prevent recrystallization phenomena which could occur during the drying operation. The presence of silicon or boron is clearly not compatible with the formation of a heavy cation fluoride glass, but it has been found that silicon or boron was eliminated during the fluorination stage in the form of extremely volatile boron trifluoride or silicon tetrefluoride.

Another embodiment of the invention consists of preparing an oxygenated gel containing only the cations entering into the final composition of the sought fluoride glass, with the exclusion of silicon and boron. This is made a little more difficult by the absence of silicon, which has a remarkable gelling capacity. It therefore requires very strict monitoring of the precursor introduction and mixing conditions. It is therefore necessary to avoid any zirconium alkoxide present hydrolyzing very rapidly, e.g. as from the precursor mixing stage. However, this procedure makes it possible to reduce the quantity of fluorinating agents subsequently required during the fluorination stage. Thus, in the presence of silicon, each silicon atom consumes four fluorine anions. Therefore the treatment time is shortened. Finally, there is no risk of retaining a residual silicon concentration exceeding the desired tolerances for a fluoride glass. Thus, cations with a high polarizing power such as silicon reduce the infrared transmission at wavelengths and constitute privileged fixing sites for anionic oxygen. This is not desirable in the production of optical fibres.

In general terms, introduction takes place in the form of alkoxides of cations which are to be present in majority form in the fluoride glass obtained. These metal alkoxides are of general formula $M(RO)_n$, in which M represents the metal, i.e. one of the constituent cations of the fluoride glass, R is an alkyl radical and n represents the valency of the metal. R is a straight or branched alkyl radical having 1 to 4 carbon atoms. As radicals R, reference can be made to methyl, ethyl, n-propyl, isopropyl, n-butyl, isobutyl, sec-butyl or tert-butyl radicals.

Among these alkoxides, preference is given to the use of methoxides, because they give off methanol by hydrolysis and methanol is more easily eliminated than heavier alcohols. However, it may be necessary to use heavier alkoxides, either because they are more easy to handle, e.g. less sensitive to moisture, or because they are more easily commercially available and this is in particular the case with zirconium propoxide.

These alkoxides are dissolved in an alcoholic solution. The alcohols are generally chosen from among aliphatic alcohols having 1 to 4 carbon atoms, i.e. methanol, ethanol, n-propanol, isopropanol, n-butanol, isobutanol, sec-butanol or tert-butanol or mixtures thereof. Heavier alcohols can be considered, but they may lead to practical problems during their elimination. It is also possible to use acetone as the solvent.

To the extent that the cations present in majority form in the fluoride glass are introduced in alkoxide form, the other cations present in minority form in the glass will be supplied as salts dissolved in an aqueous, alcoholic or acid solution. These salts are e.g. carbonates, oxalates, chlorides or nitrates of one of the cations given hereinbefore. Their use is linked with possible precipitations which may occur during preparation and which are mainly dependent on the relative concentrations of the various reagents. The alcoholic solutions used are identical to those referred to hereinbefore used for the dissolving of the alkoxides.

As an acid solution, use will generally be made of carboxylic acids and in particular acetic acid. It is also possible to add thereto a variable quantity of a mineral acid such as hydrochloric or nitric acid, but provided that it is not used simultaneously with barium when the latter is present in the preparation. It is not advisable to use mineral acids such as sulphuric or phosphoric acid, due to their elimination difficulty.

Generally, this solution will be used as a hydrolysis reagent for the gel containing the alkoxides present in the starting alcoholic solution. The use limitation for this method is associated with the solubility product. If one of the salts is not very soluble in the liquid phase, it will precipitate in the microcrystalline powder state and it might not be possible to obtain the desired amorphous or vitreous material. This is in particular the case with barium nitrate as soon as its concentration reaches a significant level. This is why the simultaneous presence of barium and nitrate ions is avoided.

It is also possible to use as precursors (jointly with the alkoxides), acetates of one of the aforementioned cations and in particular acetates of lanthanum, aluminium or sodium dissolved in one of the aforementioned alcoholic solutions.

The respective concentrations of the precursors and the solvents can vary very widely. A considerable solvent excess will lead to a significant rise in the drying and densification time and in a reduced viscosity at the time of gelling. The aim is therefore to have a precursor concentration in the solvent which is as high as possible. Thus, conditions are used which are not too far removed from saturation. When the precursors are already commercially supplied in alcoholic solution, said solution will be directly used. In the case of solid precursors, dissolving firstly takes place in an alcoholic medium with a minimum, but adequate volume so as not to require an excessive solubilization time. Tetramethoxysilane, which is liquid in the pure state, is used as it is.

The hydrolysis of the thus prepared gel can consequently take place in the manner described hereinbefore by an acid solution, such as by one of those referred to hereinbefore. The chemical reactions taking place during the preparation of the oxygenated gels are indicated below.

The two following hydrolysis reactions can occur:

$$M(OR)_n + H_2O \rightarrow M(OR)_{n-1}OH + ROH \qquad (I)$$

or in general terms:

$$M(OR)_n + nH_2O \rightarrow M(OH)_n + nROH \qquad (II)$$

n being an integer between 1 and 4, n representing one of the aforementioned metals corresponding to the constituent cations of the fluoride glass and R representing an alkyl group containing 1 to 4 carbon atoms, such as those referred to hereinbefore.

The gel drying stage is then performed at a temperature preferably between approximately 20 and 120° C. During this drying stage, there is a polycondensation permitting the creation of an oxide group from two hydroxyl groups which condense, together with an elimination of water in accordance with one of the two following reactions:

$$M(OR)_{n-1}OH + M(OR)_{n-1}OH \rightarrow (OR)_{n-1}MO-M(OR)_{n-1} + \overrightarrow{H_2O} \qquad (III)$$

or in general terms:

$$M(OR)_{n-m}(OH)_m + M(OR)_{n-p}(OH)_p \rightarrow (OR)_{n-m}(OH)_{m-1}M-O-M(OR)_{n-p}(OH)_{p-1} + \overrightarrow{H_2O} \qquad (IV)$$

with M and R having the meanings given hereinbefore and n, m and p are integers respectively between 1 and 4, between 1 and 3 and between 1 and 3.

The deposition of the colloidal solution of precursors takes place by dip coating or by spraying from a reduced viscosity solution. Centrifuging also lead to satisfactory results. This is followed by the fluorination stage.

The characteristic stage of the invention consists of carrying out a fluorination treatment of the oxygenated gel prepared in the manner described hereinbefore. This fluorination stage is performed with the aid of a fluorinating agent in the vapour phase and which is advantageously hydrogen fluoride HF. The latter is a very suitable reagent, because it is commercially available with a high degree of purity. In addition, it is not difficult to handle. It is also possible to use in a very satisfactory manner pure gaseous fluorine or gaseous fluorine diluted in an inert gas stream or bromine or chlorine trifluorides. The well known reactivity of these products makes it possible to carry out fluorination operations at lower temperatures or with faster kinetics than with hydrogen fluoride. The temperature of this fluorination treatment is adjusted as a function of the nature of the fluorinating agent, the mass of the gel and the reaction times, but is generally between approximately 150° and 250° C.

However, it is observable with hydrogen fluoride and for temperatures below 150° C., that the fluorination stage generally lasts more than 10 hours, which starts to make the practical performance of the process according to the invention difficult and expensive. Therefore it is preferable not to drop below 150° C. Conversely, fluorination at beyond 400° C. can easily lead to a mixture of complex, crystalline fluorides. When the temperature of 250° C. is not exceeded, the final powder obtained remains in amorphous form, but provided that the initial gel is in this form.

It is also easy to demonstrate that, apart from the temperature, the ratio between the partial pressures of the fluorinating agent, particularly hydrogen fluoride, and water is important for the reaction kinetics.

Fluorination corresponds to a chemical reaction, whose equilibrium constant is equal to the ratio of the partial pressures of water and hydrogen fluoride or more generally the fluorinating agent. It is relatively easy to evaluate this ratio. As the fluorination stage is performed within an enclosure, the partial pressure of HF in the latter is close to 760 mm of mercury. The steam pressure on leaving the enclosure is normally that of saturated steam at 30 to 40° C., i.e. approximately 50 mm of Hg. The ratio between the partial pressures of hydrogen fluoride and water is consequently approximately 15. It is therefore desirable for this value to exceed 10, because below this figure there is an increase in the treatment time and temperature, which is prejudicial to the efficiency of the process or the nature of the substrate used for depositing the oxygenated gel.

The fluorination reactions taking place within this enclosure are indicated below, as a function of the starting oxide obtained following the condensation stage:

$$MO_2 + 4HF \rightarrow MF_4 + 2H_2O \qquad (V)$$

$$M_2O_3 + 6HF \rightarrow 2MF_3 + 3H_2O \qquad (VI)$$

$$MO + 2HF \rightarrow MF_2 + H_2O \qquad (VII)$$

$$MO_{k-x}(OH)_{2x} + 2xHF \rightarrow MF_{2k} + 2xH_2O \qquad (VIII)$$

M representing one of the metals indicated hereinbefore, k generally being between 1 and 2 and x having a variable value corresponding to the degree of residual hydration of the gel at the time of its fluorination.

A gaseous HF flow must be maintained within the enclosure in order to eliminate the water produced by the fluorination reaction and that still left in the oxygenated gel at the end of the drying stage.

The synthesis process according to the invention can enable the production of glasses known under the standard designations ZB, ZNB, ZBNA, ZBLA or ZBLAN. These glasses contain specific percentages of different fluorides, whose quantities are given in the following Table 1.

TABLE 1

| Fluoride Glass Names | Percentages Of | | | | |
| --- | --- | --- | --- | --- | --- |
| | $Zr_4$ | $BaF_2$ | $AlF_3$ | $LaF_3$ | $NaF$ |
| ZB | 60 | 40 | — | — | — |
| ZNB | 57 | 29 | — | — | 14 |
| ZBNA | 42 | 24 | 4 | — | — |
| ZBLA | 57 | 34 | 4 | 5 | — |
| ZBLAN | 53 | 20 | 3 | 4 | 20 |

The following examples describe the tests carried out during the performance of the synthesis process according to the invention.

EXAMPLE 1

A wet, stable oxygenated gel was prepared from the following precursors: zirconium propoxide, $Zr(OC_3H_7)_4$, and sodium methoxides, $Si(OCH_3)_4$ and $Na(OCH_3)$ and barium chloride $BaCl_2$. The alkoxides were dissolved in a methanol solution. The barium chloride was dissolved in a hydrochloric acid solution, which had been used for carrying out the hydrolysis stage. Following this stage, approximately 20 g of a wet gel were obtained containing in relative cationic proportions 57% Zr, 29% Ba and 14% Na. In moles, the silicon quantity introduced was close to that of the zirconium.

This was followed by a progressive drying of the gel in air for one week, followed by passing into an oven at 110° C. for 10 hours. The gel then underwent a fluorination treatment by gaseous hydrogen fluoride for 3 hours at 300° C. Although the preferred fluorination temperature range is 150° to 250° C., it is possible to pass outside these optimum values, but without exceeding the glass transition temperatures. The latter are generally between 250° and 400° C., as a function of the different glasses.

The powder obtained after treatment was then melted in a platinum crucible and in a dry air atmosphere. After casting, a transparent ZNB glass sample was obtained, whose differential thermal analysis curve has the expected characteristics for a glass having this composition.

EXAMPLE 2

A wet oxygenated gel was prepared from the following precursors: propoxide of zirconium, aluminium and lanthanum and barium ethoxide. The weight of these precursors was 8 g. The gel obtained had the relative cationic proportions of 57% Zr, 34% Ba, 5% La and 4% Al, which corresponds to those of the standard fluoride glass ZBLA, everything being contained in an alcoholic solution. The sol-gel solution was introduced into a glass flask connected to a condenser and then heated to 60° C., accompanied by stirring.

This was followed by the hydrolysis stage by adding an acetic acid solution containing a slight water excess compared with the theoretical quantity. Stirring was maintained for 3 to 6 hours. After cooling, the liquid obtained was poured into a container, where it gelled after 10 to 20 hours. This was followed by a progressive drying of the liquid at ambient temperature and under ambient air conditions for 5 to 10 days. This gave transparent, rigid material fragments dried further by stoving at between 90° and 130° C. The fluorination treatment was carried out by means of gaseous hydrogen fluoride for 1 hour and at 210° C. The X-ray diffraction spectrum confirms that the final material is amorphous. Differential scanning calorimetric analysis confirmed the vitreous nature thereof.

EXAMPLE 3

A wet oxygenated gel was prepared from the following precursors: propoxides of zirconium, aluminium and lanthanum, sodium mathoxide and barium ethoxide dissolved in ethanol. About 20 grammes of a wet gel were obtained with a relative cationic composition of 53% Zr, 20% Ba, 4% La and 3% Na corresponding to the standard fluoride glass ZBLAN. The hydrolysis stage was performed with acetic acid. After drying and fluorination treatment using a gaseous hydrogen fluoride for 90 minutes and at 200° C., a powder was obtained.

Figure 2:
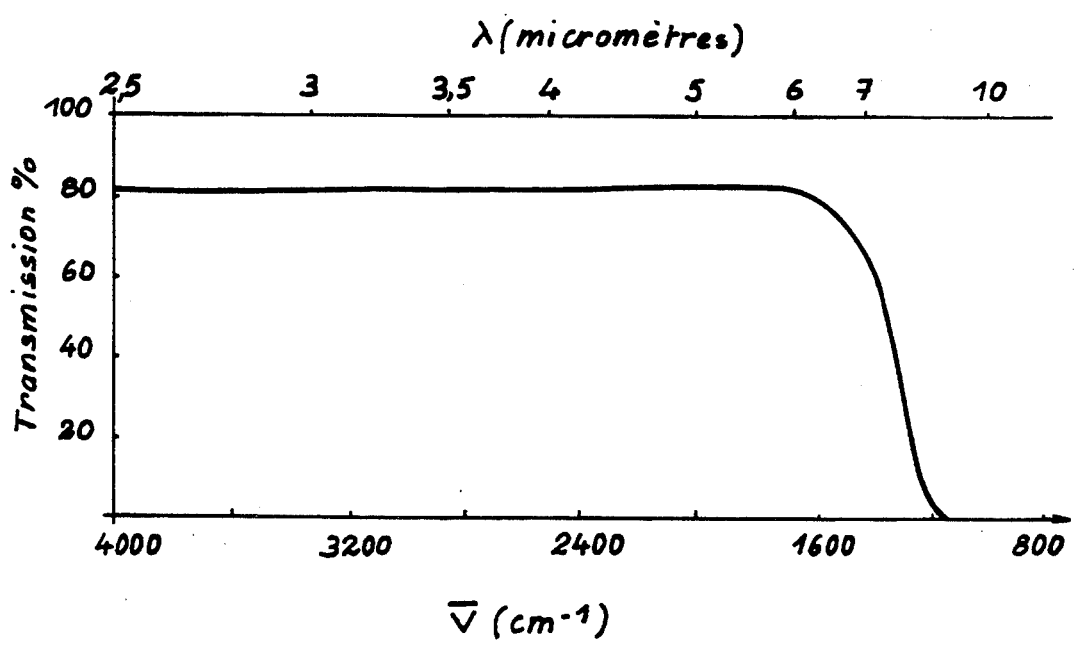
FIG. 2 The variation of the infrared transmission in % as a function of the wavelength λ in micrometres or the wave number $\overline{V}$ in cm$^{-1}$.

The differential calorimetric analysis of this powder is given in FIG. 1. The latter shows the variation of the thermal flux as a function of the temperature T for a temperature rise rate of 10° C. per minute. At A there is the characteristic glass transition step representing the heat capacity difference of the glass in the solid state (prior to the transition) and in the pasty, liquid state (after the transition). At B can be seen the exothermic crystallization peaks and at C the endothermic melting signal. The existence of a group of exothermic peaks at B demonstrates that the material recrystallizes and was therefore still amorphous before said temperature. The existence of the glass transition and the recrystallization proved the vitreous nature of the powder. Thus, an amorphous powder would only have exothermic recrystallization peaks and no base line step at A. It can also be seen that the differential calorimetric analysis curve of the glass powder obtained by the sol-gel method is identical to that of a conventionally synthesized glass, which has then been reduced into powder form. The vitreous powder was then melted under an anhydrous atmosphere and cast in the form of a 3.3 mm thick plate, following polishing. The infrared transmission spectrum of this sample is given in FIG. 2. It is possible to see the position of the base line (transmission slightly above 80%) representing the transmission tosses linked with the FRESNEL reflexions on the entrance and exit faces, as well as the losses linked with the imperfection of the polishing and sampling in the measuring apparatus. The absence of an absorption band towards the wave-length of 3 microns is remarkable, as is the absence of a shoulder in the infrared absorption limit between 6 and 9 microns. These two observations demonstrate the high degree of purity or the glass obtained by this method.

An optical fibre produced from the fluoride glass obtained by the process according to the invention can e.g. be produced in accordance with the Following conventional glass making process. Firstly the fluoride glass constituting the cladding and that constituting the core of the optical fibre is produced. This is followed by the production of a preform or blank by producing a cladding glass tube within which is cast the glass constituting the optical fibre core. This gives a blank which is annealed and polished. Finally, the blank is drawn in a protected atmosphere, coated with a resin, e.g. methacrylate and then a polymerization process is carried out by UV. The optical fibre obtained is then wound onto a drum.

This production process is of a conventional nature and is consequently not described in detail.

We claim:

1. A process for the synthesis of fluoride glass by the sol-gel method, comprising the steps of:
   i) preparing a wet oxygenated gel from precursors containing all of the cations which constitute said fluoride glass;
   ii) hydrolyzing said gel;
   iii) drying said gel; and then
   iv) treating said dried gel by a fluorinating agent in the vapor phase at a temperature below the crystallization temperature of the glass, said fluorinating agent being selected from the group consisting of hydrogen fluoride, gaseous fluorine, chlorine trifluoride and bromine trifluoride.

2. The process of claim 1, wherein the fluorination temperature is between about 150° and 250° C.

3. The process of claim 1, wherein the constituent cations of the fluoride glass are selected from the group consisting of the lanthanide elements, the actinide elements, and elements of Groups Ia, IIa, IIIa, IVa, IIb, IIIb, IVb of the periodic classification of elements.

4. The process of claim 3, wherein the constituent cations of the fluoride glass are selected from the group consisting of sodium, magnesium, calcium, strontium, barium, scandium, yttrium, lanthanum, thorium, zirconium, hafnium, zinc, cadmium, boron, aluminum, gallium, indium, silicon and lead.

5. The process of claim 1, wherein the precursors employed for the preparation of the wet oxygenated gel are $C_1$-$C_4$ alkoxides of the constituent cations of the fluoride glass dissolved in an alcoholic solution.

6. The process of claim 5, wherein the precursors are methoxides of the constituent cations of the fluoride glass.

7. The process of claim 1, wherein the precursors employed for the preparation of the wet oxygenated gel incorporate $C_1$-$C_4$ alkoxides of the constituent cations of the fluoride glass dissolved in an alcoholic solution and salts of the constituent cations of the fluoride glass, said salts being dissolved in a aqueous, alcoholic or acid solution.

8. The process of claim 7, wherein the salts are selected from the group consisting of the carbonates, oxalates, chlorides and nitrates.

9. The process of claim 1, wherein the precursors employed for the preparation of the wet oxygenated gel comprise $C_1$-$C_4$ alkoxides of the constituent cations of the fluoride glass dissolved in an alcoholic solution and acetates of the constituent cations of the fluoride glass dissolved in an alcoholic solution.

10. The process of claim 9, wherein the acetates are selected from the group consisting of lanthanum, aluminum and sodium acetate.

11. The process of claim 5, wherein the alcohol component of the alcoholic solution is a $C_1$-$C_4$ aliphatic alcohol or mixtures of $C_1$-$C_4$ aliphatic alcohols.

12. The process of claim 1, wherein the hydrolysis of the gel occurs in an acid solution.

13. The process of claim 7, wherein said acid solution is prepared from an acid selected from the group consisting of acetic acid, hydrochloric acid and nitric acid.

14. The process of claim 12, wherein the acid of said acid solution is selected from the group consisting of acetic acid, hydrochloric acid and nitric acid.

15. The process of claim 7, wherein the alcohol component of the alcoholic solution is a $C_1$-$C_4$ aliphatic alcohol or mixtures of $C_1$-$C_4$ aliphatic alcohols.

16. The process of claim 9, wherein the alcohol component of the alcoholic solution is a $C_1$-$C_4$ aliphatic alcohol or mixtures of $C_1$-$C_4$ aliphatic alcohols.

17. The process of claim 1, wherein the oxygenated gel is dried at a temperature ranging from about 20° to 120° C.

* * * * *